(No Model.)

A. B. FRIEDRICH & D. O. EUSTICE.
MEANS FOR SECURING TIRES TO VEHICLE WHEELS.

No. 586,765. Patented July 20, 1897.

WITNESSES
John Enders Jr.

INVENTORS
Albert B. Friedrich
David O. Eustice
by Henry P. Blair Attorney

United States Patent Office.

ALBERT B. FRIEDRICH AND DAVID O. EUSTICE, OF LIVINGSTON, WISCONSIN.

MEANS FOR SECURING TIRES TO VEHICLE-WHEELS.

SPECIFICATION forming part of Letters Patent No. 586,765, dated July 20, 1897.

Application filed October 23, 1895. Serial No. 566,609. (No model.)

*To all whom it may concern:*

Be it known that we, ALBERT B. FRIEDRICH and DAVID O. EUSTICE, citizens of the United States, residing at Livingston, in the county of Grant and State of Wisconsin, have invented certain new and useful Improvements in Methods of and Compounds for Securing Tires to Vehicle-Wheels; and we do hereby declare the following to be a full, clear, and exact description of the invention, such as will enable others skilled in the art to which it appertains to make and use the same.

The invention relates to the method of and means for applying tires to vehicle-wheels without the requirement of skilled labor or necessitating the cutting and shrinking of the tire upon the wheel.

The invention consists in a novel manner of applying tires to vehicle-wheels by inserting between the tire and felly an intermediate layer of fireproof material and a compound which is hard at ordinary temperature, but is softened on the application of heat, so as to enable the tire to be placed in position.

Figure 1:
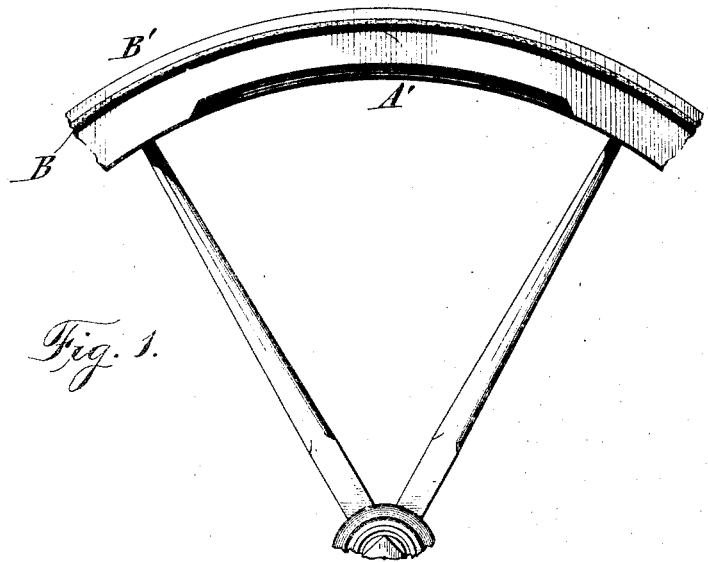
Figure 2:
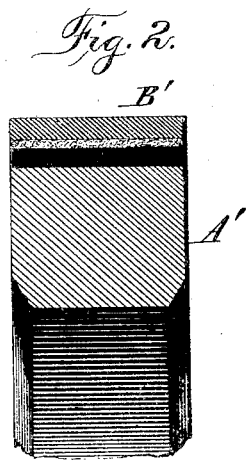
Figure 3:
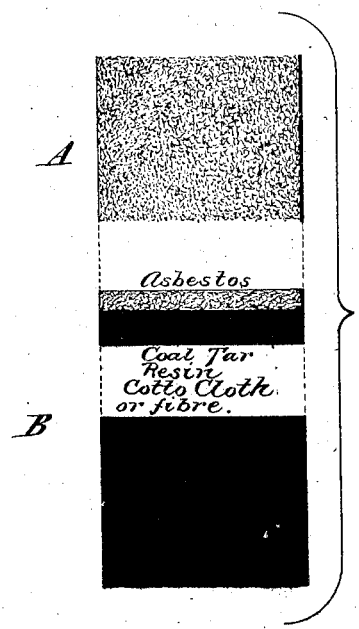

In the accompanying drawings, Figure 1 is a face view of a section of a vehicle-wheel, showing the tire applied by the improved method. Fig. 2 is a transverse section of the same; Fig. 3, an enlarged transverse section of the material.

In applying tires to vehicle-wheels heretofore either in the first instance or when the tire becomes loose by the shrinking of the wooden parts or from other causes it was found necessary to cut the tire, reweld the same, and then shrink it upon the wheel, this necessitating not only the employment of skilled labor, but of mechanical tools and appliances. This has been found objectionable to farmers and others who did not possess the skill or have the tools at hand, and to provide means to place it within the power of such to apply the tires we have designed the invention.

The material for enlarging the felly A' consists, preferably, of a strip of asbestos A to come next to the tire on the inside and a cement composed of coal-tar, resin, and cotton cloth or fiber B, the whole forming a fire and water proof lagging, but other material may be used as shall be found convenient whereby to enlarge the felly to fit the tire. This is cut into strips of proper widths and tacked to the wheel, which when the tire B' or the material has been heated to cause it to adhere to the wheel and tire and then to harden.

By the form of lagging and the method herein described of applying the same it will be seen that the lagging is cemented to the felly and tire by the compound soaking through the asbestos when the heated tire is placed on the wheel and that the strip of asbestos prevents the heated tire from setting fire to the felly, and that by which construction we are enabled to apply a tire to wheels without cutting.

Having now described the invention, what is claimed as new, and sought to be secured by Letters Patent, is—

As a means for applying tires to vehicle-wheels the combination with the felly and tire, of an intermediate strip or layer of fire and water proof material or lagging and a compound which is hard at ordinary temperature but is softened on the application of heat to enable the tire to be placed in position substantially as described.

In testimony whereof we affix our signatures in presence of two witnesses.

ALBERT B. FRIEDRICH.
DAVID O. EUSTICE.

Witnesses:
JAMES W. MURPHY,
E. R. FRIEDRICH.